(12) United States Patent
Tomioka

(10) Patent No.: US 7,889,408 B2
(45) Date of Patent: Feb. 15, 2011

(54) OPTICAL SCANNING APPARATUS AND IMAGE FORMING APPARATUS USING THE SAME

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/543,371

(22) Filed: Aug. 18, 2009

(65) Prior Publication Data

US 2010/0046055 A1    Feb. 25, 2010

(30) Foreign Application Priority Data

Aug. 22, 2008 (JP) ............... 2008-213757

(51) Int. Cl.
G02B 26/08 (2006.01)
(52) U.S. Cl. .................. 359/205.1
(58) Field of Classification Search .............. 359/205.1, 359/206.1, 216.1
See application file for complete search history.

(56) References Cited

U.S. PATENT DOCUMENTS

| | | | |
|---|---|---|---|
| 6,636,340 B1 * | 10/2003 | Hama et al. ............... | 359/204.1 |
| 6,801,239 B2 | 10/2004 | Nakahata | |
| 7,053,922 B2 | 5/2006 | Kato | |
| 7,242,420 B2 | 7/2007 | Seto | |
| 2003/0234857 A1 | 12/2003 | Nakahata | |
| 2004/0027446 A1 | 2/2004 | Kato | |
| 2005/0264645 A1 | 12/2005 | Seto | |

FOREIGN PATENT DOCUMENTS

| | | |
|---|---|---|
| JP | 2004-021133 A | 1/2004 |
| JP | 2004-070107 A | 3/2004 |
| JP | 2005-338573 A | 12/2005 |

* cited by examiner

*Primary Examiner*—Euncha P Cherry
(74) *Attorney, Agent, or Firm*—Canon U.S.A., Inc. I.P. Division

(57) ABSTRACT

An optical scanning apparatus having a low-height optical box and accurately arranged reflecting mirrors, and an image forming apparatus using the same. The imaging optical system includes: an imaging optical element which a scanning beam transmits off a profile center thereof in a sub-scanning direction during guiding a beam from a light source to a scanning surface by an imaging optical system via a deflector; a first mirror which deflects the beam transmitted the imaging optical element to fold an optical path toward the edge-surface-A side where within the sub-scanning section, the edge surface A is one of the edge surfaces of the imaging optical element closer to a passing position of the scanning beam; and a second mirror. The second mirror is disposed between the deflection unit and imaging optical element so that the second mirror exists across a plane including the edge surface A.

8 Claims, 7 Drawing Sheets

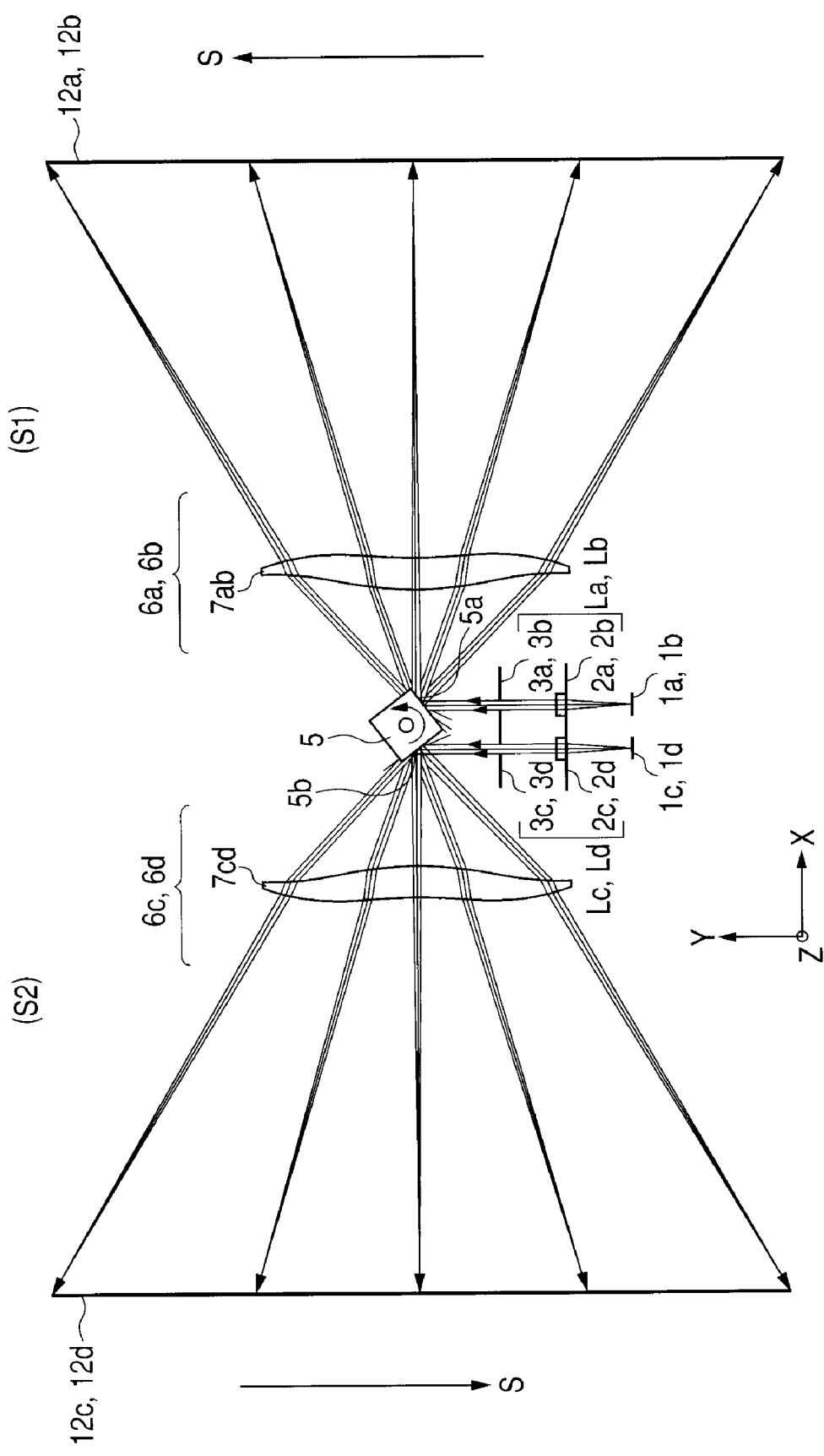

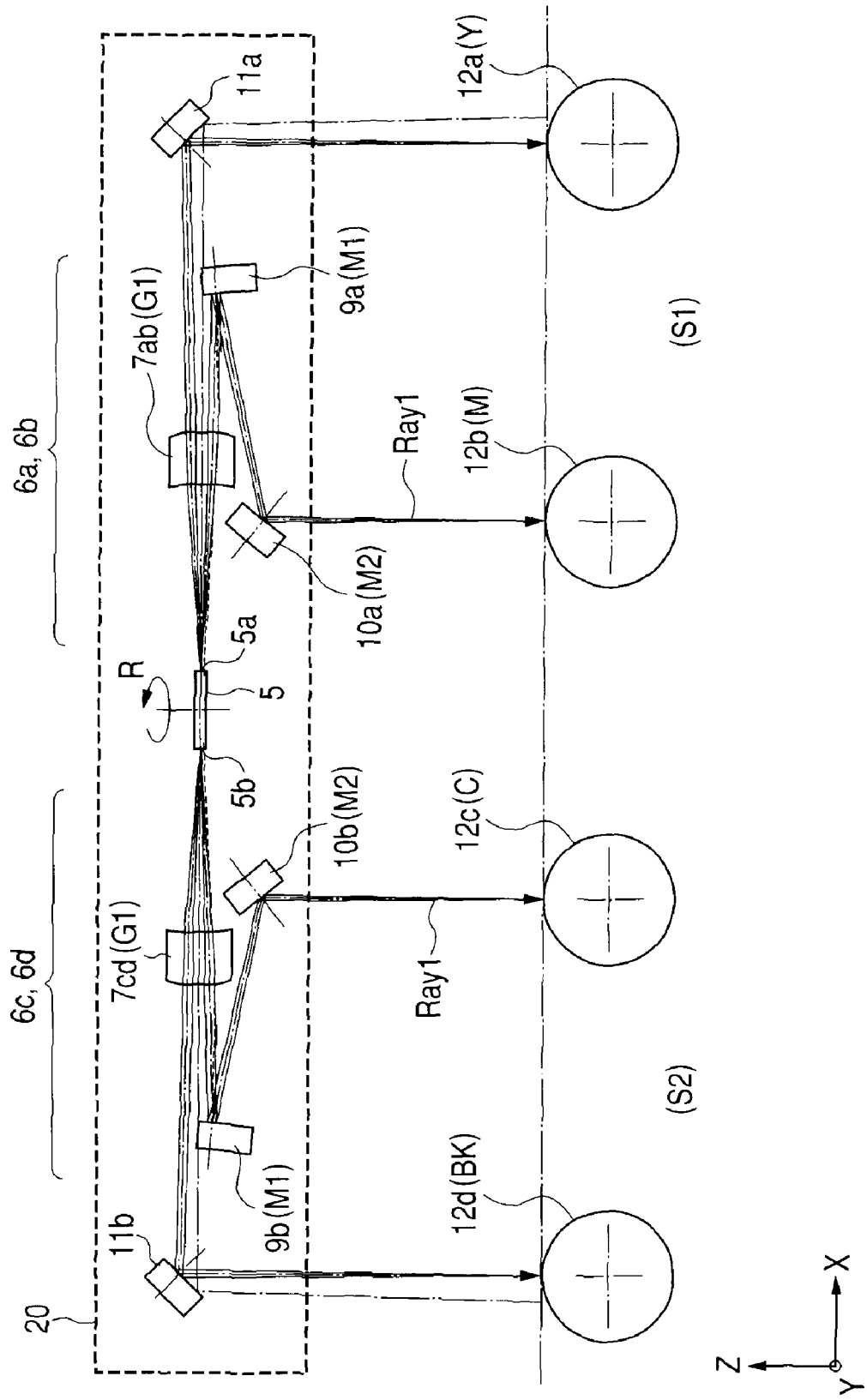

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the same. For example, the present invention is suitable for an image forming apparatus such as a laser beam printer (LBP), a digital copying machine, or a multi-function printer, which adopts an electrophotography process.

2. Description of the Related Art

Various color image forming apparatuses have conventionally been proposed, each of which includes light source unit, multiple scanning optical systems having imaging optical systems, and deflection unit common among the multiple scanning optical systems, and guides light beams emitted from the multiple scanning optical systems onto multiple corresponding image bearing members to form a color image (see Japanese Patent Application Laid-Open No. 2004-21133, Japanese Patent Application Laid-Open No. 2004-70107, and Japanese Patent Application Laid-Open No. 2005-338573).

Referring to FIG. 6, main components and optical operations of the above-mentioned conventional color image forming apparatus are described.

In FIG. 6, an image forming unit includes two scanning units SR and SL. The two scanning units SR and SL each have a symmetrical configuration with respect to an optical deflector 28. Thus, the reference numerals are described in FIG. 6 only for one (the scanning unit SR) of the two scanning units.

In the scanning unit SR shown in FIG. 6, a light beam optically modulated based on image information to be emitted travels via a rotational polygon mirror 28 (polygon mirror) which deflects the light beam for scanning, and an imaging optical system LB which has two fθ lenses 29 and 30 which forms an image of the light beam on a photosensitive drum surface 42 (43) in a spot shape. The light beam passed through each of the fθ lenses 29 and 30 travels via a reflecting mirror 31a (31b to 31d) which reflects the light beam in a specific direction and a dust-proof glass 32 (33) which protects the imaging optical system LB from dusts. The light beam passed via the dust-proof glass 32 (33) forms an electrostatic latent image on the photosensitive drum surface 42 (43). The image forming unit includes an optical box 41.

With a progress in configuring an image forming apparatus compact, a system for scanning four photosensitive drums for exposure by one polygon mirror 28 has been adopted in an optical scanning apparatus as illustrated in FIG. 6.

This system includes the two scanning units SR and SL for irradiating opposed surfaces of the polygon mirror 28 with two light beams. The scanning units SR and SL cause two light beams shifted in parallel by a predetermined distance in a sub-scanning direction (vertical direction) to enter a deflecting surface (reflection surface) of the polygon mirror 28 for deflecting the light beams for scanning.

This system includes the two fθ lenses 29 and 30 for imaging the light beams in two upper and lower optical paths on the photosensitive drum surfaces 42 and 43. The two fθ lenses 29 and 30 constitute the imaging optical system LB that includes identical lens surfaces disposed at two upper and lower stages. Its manufacturing method is bonding-together of two lenses or integral molding thereof as a mold lens.

In the scanning unit that uses the imaging optical system LB having the fθ lenses 29 and 30 arranged at the two upper and lower stages, a deflecting surface for deflecting a light beam for scanning with respect to each optical path is necessary for the polygon mirror 28, and a polygon mirror thick in vertical direction or a polygon mirror of a two-stage configuration is used. In this system, since a large polygon mirror is adopted, the load on a motor to drive the polygon mirror is apt to increase.

The above-mentioned conventional color image forming apparatus has had various problems described below.

A first problem is a necessity of an extremely large number of reflecting mirrors for guiding a light beam to the photosensitive drum. For example, in FIG. 6, three reflecting mirrors 31b to 31d are used in the same optical path.

As a result, the apparatus becomes complicated due to the increase in number of components, and the entire apparatus becomes large in size due to the necessity of space to contain the mirrors.

Japanese Patent Application Laid-Open No. 2004-21133 discusses an optical scanning apparatus configured by considering a size of an imaging lens, setting a reflection angle of a reflecting mirror to avoid the imaging lens, and disposing two or one reflecting mirror in the same optical path.

In the optical scanning apparatus discussed in each of Japanese Patent Application Laid-Open No. 2004-21133, Japanese Patent Application Laid-Open No. 2004-70107, and Japanese Patent Application Laid-Open No. 2005-338573, in the optical path for guiding a light beam to an inner surface to be scanned with respect to the optical deflector, a reflection angle of a first mirror is set large to prevent the light beam reflected by the first mirror from being vignetted by the fθ lens. Thus, a position of a second mirror which reflects the reflected light beam from the first mirror is greatly away from the fθ lens, resulting in a larger width of the optical box in a height direction.

Japanese Patent Application Laid-Open No. 2005-33873 discusses a method for reducing a height of an imaging optical system in a sub-scanning direction. In Japanese Patent Application Laid-Open No. 2005-338573, this method tries to reduce a height of an apparatus by focusing on a reflection angle of a reflecting mirror, a distance from an imaging lens to the reflecting mirror, and a height of the imaging lens. In particular, limiting a height of the imaging lens to 6 to 10 mm enables reduction of a folding angle of an optical path.

However, in a lens made of a resin (may be referred to as resin lens hereinafter) generally used for the imaging lens, the following problems arise if a height of the imaging lens is set low.

In the resin lens formed by a mold, when a height of the lens is set low with respect to a thickness of the lens in an optical axis direction, during cooling immediately after taken-out from the mold, the cooling progresses from a vertical direction of the lens. As a result, a refractive index distribution and a birefringence distribution easily occur in the lens within a sub-scanning section (height direction of the lens). Consequently, imaging performance is considerably reduced in a sub-scanning direction. Thus, in the method of Japanese Patent Application Laid-Open No. 2005-338573, reduction of the lens height is difficult.

SUMMARY OF THE INVENTION

It is an object of the present invention to provide an optical scanning apparatus capable of setting a height of an optical box low and forming a good image, and an image forming apparatus using the same.

According to one aspect of the present invention, an optical scanning apparatus comprises: a light source unit; a deflection unit for deflecting a light beam emitted from the light source unit for scanning; and an imaging optical system for imaging, on a surface to be scanned, the light beam deflected by a deflecting surface of the deflection unit, wherein the imaging optical system comprises, in an optical path in the following order from a side of the deflection unit: an imaging optical element (G1); a first reflecting mirror (M1); and a second reflecting mirror (M2), wherein the second reflecting mirror (M2) is disposed, within a sub-scanning section, between the deflection unit and the imaging optical element (G1) in a direction of an optical axis of the imaging optical system, and wherein the second reflecting mirror (M2) and the imaging optical element (G1) overlap each other in a sub-scanning direction within the sub-scanning section.

According to another aspect of the present invention, in the optical scanning apparatus, a plurality of light beams enters the same deflecting surface of the deflection unit, the plurality of light beams enters the different surfaces to be scanned, the plurality of the light beams guided to a plurality of the different surfaces to be scanned passes, within the sub-scanning section, through the respective different areas of the imaging optical element (G1), the light beam (Ray1) of one of the plurality of the light beams passes through the imaging optical element (G1) through a position displaced from a profile center of the imaging optical element (G1) in the sub-scanning direction, within the sub-scanning section, and when within the sub-scanning section, one of two edge surfaces of the imaging optical element (G1), which is closer to a passing position of the light beam (Ray1) is defined as an edge surface A, and the other edge surface which is farther from the passing position of the light beam (Ray1) is defined as an edge surface B, the first reflecting mirror (M1) reflects the light beam (Ray1) having passed through the imaging optical element (G1) within the sub-scanning section to fold the optical path toward a edge-surface-A side.

According to still another aspect of the present invention, in the optical scanning apparatus, within the sub-scanning section, the light beam (Ray1) enters the deflecting surface of the deflection unit from a direction oblique to the optical axis of the imaging optical system.

According to a further aspect of the present invention, in the optical scanning apparatus, the light beam (Ray1) is a light beam guided to the surface to be scanned which is physically closest to the deflection unit among the plurality of surfaces to be scanned within the sub-scanning section.

According to a further aspect of the present invention, in the optical scanning apparatus, the first reflecting mirror (M1) and the second reflecting mirror (M2) overlap each other in the sub-scanning direction within the sub-scanning section.

According to a further aspect of the present invention, in the optical scanning apparatus, the plurality of the light beams deflected by the same deflecting surface of the deflection unit do not intersect one another in the sub-scanning section after passing through the imaging optical element (G1).

According to a further aspect of the present invention, in the optical scanning apparatus, the following conditional expression (1) is satisfied:

$$ATAN\left[\frac{\{0.55 \times h - L2 \times \tan(\alpha) - \sigma\}}{L2 - L1}\right] < \qquad (1)$$
$$\theta < ATAN\left[\frac{\{h - L2 \times \tan(\alpha) - \sigma\}}{L2 - L1}\right]$$

where $\alpha$ denotes an oblique incident angle or a principal ray of the light beam (Ray1) in the sub-scanning direction, which enters the deflecting surface of the deflection unit from a direction oblique to the optical axis of the imaging optical system within the sub-scanning section; L1 (mm) denotes an interval in the optical axis direction of the imaging optical system, between a deflection-for-scanning point O and an optical surface on the surface-to-be-scanned side of the imaging optical element (G1), at which the scanning light beam (Ray1) guided to an axial image height is deflected; L2 (mm) denotes an interval in the optical axis direction of the imaging optical system, between the deflection-for-scanning point O and a reflection point P of the first reflecting mirror (M1); h (mm) denotes a length of the imaging optical element (G1) in the sub-scanning direction; $\sigma$ (mm) denotes an interval in the sub-scanning direction between the deflection-for-scanning point O and a profile center C of the imaging optical element (G1); and $\theta$ (degree) denotes an angle, in the sub-scanning direction, between the principal ray of the light beam (Ray1) reflected by a reflection surface of the first reflecting mirror (M1) and a plane perpendicular to a rotational axis of the deflection unit.

According to a further aspect of the present invention, in the optical scanning apparatus, projections of the imaging optical element (G1), the first reflecting mirror (M1), and the second reflecting mirror (M2) onto a main scanning section do not overlap one another.

According to one aspect of the present invention, an image forming apparatus comprises: the optical scanning apparatus set out in the foregoing; a photosensitive drum disposed on the surface to be scanned; a developing device for developing, as a toner image, an electrostatic latent image formed on the photosensitive drum by scanning with the scanning light beam by the optical scanning apparatus; a transferring device for transferring the developed toner image to a transfer material; and a fixing device for fixing the transferred toner image onto the transfer material.

The present invention may provide an optical scanning apparatus capable of setting the height of the optical box low and accurately arranging the reflecting mirrors, and the image forming apparatus using the same.

Further features of the present invention will become apparent from the following description of exemplary embodiments with reference to the attached drawings.

BRIEF DESCRIPTION OF THE DRAWINGS

FIG. 1A is a main-scanning sectional view according to a first embodiment of the present invention.

FIG. 1B is a sub-scanning sectional view according to the first embodiment of the present invention.

DESCRIPTION OF THE EMBODIMENTS

Exemplary embodiments of the present invention are described below with reference to the drawings.

First Embodiment

FIG. 1A illustrates a main portion sectional view in a main-scanning direction (main-scanning sectional view) according to a first embodiment of the present invention, and FIG. 1B illustrates a main portion sectional view in a sub-scanning direction (sub-scanning section) according to the first embodiment of the present invention. For easier understanding of the present invention, FIG. 1A is a development view omitting a reflecting mirror for folding a scanning beam in a sub-scanning direction.

In the description below, the sub-scanning direction (Z direction) is a direction parallel to a rotational axis (or oscillation axis) of deflection unit. A main-scanning section is a section in which the sub-scanning direction (direction parallel to the rotational axis (or oscillation axis) of the deflection unit) is a normal line. A main-scanning direction (Y direction) is a direction along which scanning light beams deflected by the deflection unit are projected on the main-scanning section. A sub-scanning section is a section in which the main-scanning direction is a normal line.

In the optical scanning apparatus of this embodiment, multiple light beams from multiple light source unit are deflected for scanning by different deflecting surfaces of a common (single) optical deflector (polygon mirror) (deflection unit) having multiple deflecting surfaces, to optically scan different photosensitive drum surfaces via different imaging optical systems.

Figure 1C:
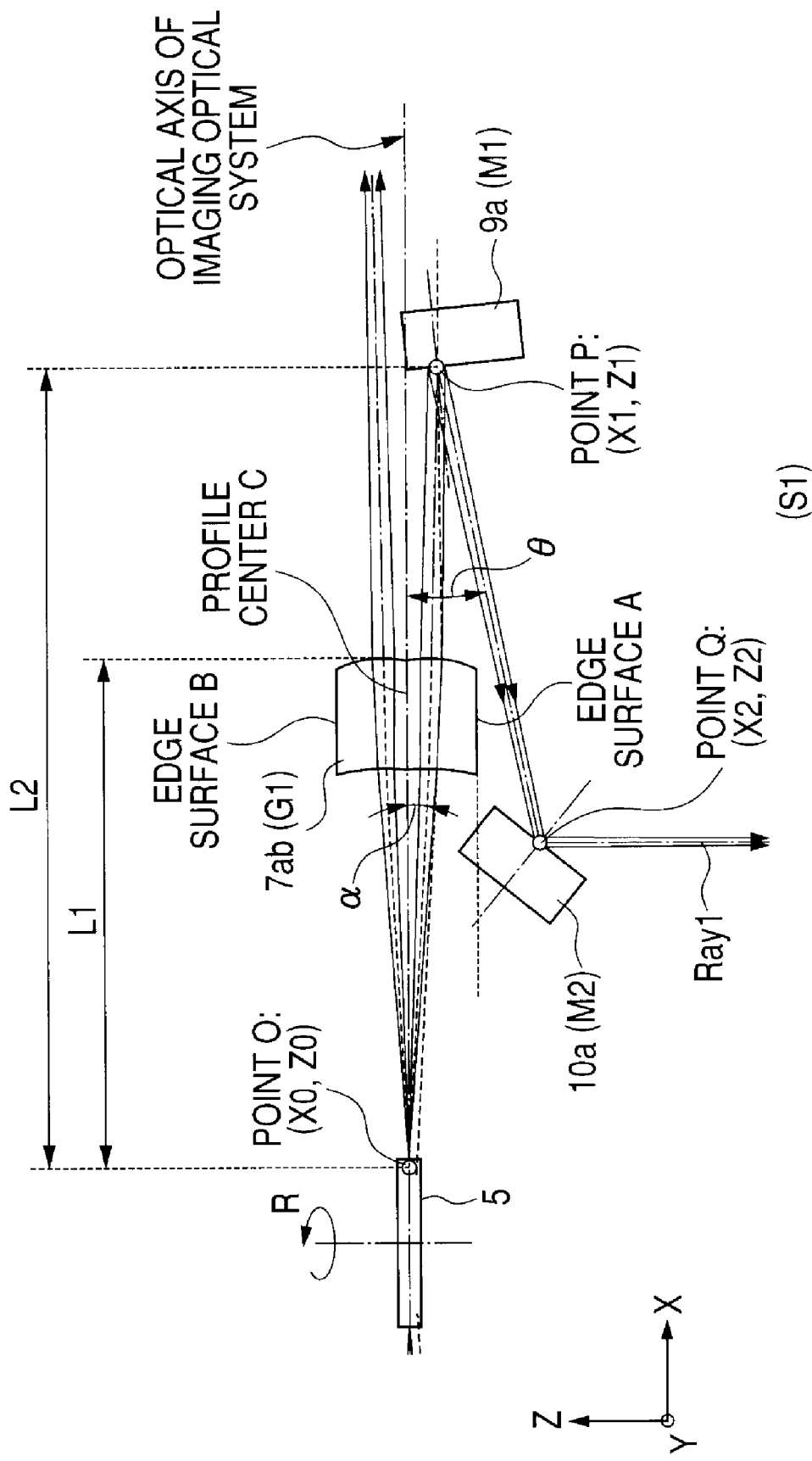
FIG. 1C is an enlarged view of a main portion (sub-scanning sectional view) according to the first embodiment of the present invention.

In FIGS. 1A to 1C, first and second stations (scanning optical systems) S1 and S2 are provided.

The light source unit (light sources) 1a to 1d each having at least one light emitting portion (light emitting point) are constituted by, for example, semiconductor lasers.

Anamorphic lenses 2a to 2d have refractive powers (powers) independently in the main-scanning and sub-scanning directions. The anamorphic lenses 2a to 2d have functions for converting focused statuses of light beams emitted from the corresponding light source unit 1a to 1d and functions for converting the light beams into linear images extending in the main-scanning direction on the deflecting surfaces of the deflection unit 5.

However, the present invention is not limited to the anamorphic lenses, and the optical scanning apparatus may be configured by using a collimator lens and a cylindrical lens having independent functions.

Aperture stops (apertures) 3a to 3d form the light beams emitted from the corresponding anamorphic lenses 2a to 2d into desired optimal beam shapes.

The anamorphic lenses 2a to 2d and the aperture stops 3a to 3d constitute incident optical systems (condensing optical systems) La to Ld.

The optical deflector 5 as deflection unit includes a rotational polygon mirror (polygon mirror) having multiple deflecting surfaces, and is rotated at a constant speed in an arrow direction R by a driving unit such as a motor to deflect light beams from the incident optical systems La to Ld for scanning.

The imaging optical systems 6a to 6d have condensing functions, fθ characteristics, and positive powers within the main-scanning and sub-scanning sections, and image multiple light beams from the optical deflector 5 on surfaces to be scanned 12a, 12b, 12c, and 12d corresponding to the respective light beams.

In this embodiment, the imaging optical systems 6a and 6b of the first station S1 have a single common imaging lens 7ab. The imaging optical systems 6c and 6d of the second station S2 have a single common imaging lens 7cd.

The imaging optical systems 6a to 6d image the light beams, which are based on image information and deflected for scanning by the optical deflector 5 as described above, on the photosensitive drum surfaces 12a to 12d as corresponding surfaces to be scanned. The imaging optical systems 6a to 6d perform optical face tangle error compensation for deflecting surfaces 5a and 5b of the optical deflector 5 by setting a conjugate relationship between the deflecting surfaces 5a and 5b and the photosensitive drum surfaces 12a to 12d within the sub-scanning section.

The mirrors (reflecting mirrors) 9a to 11a as reflection elements of the first station S1 fold an optical path in the first station S1. The mirrors (reflecting mirrors) 9b to 11b as reflection elements of the second station S2 fold an optical path in the second station S2.

The reflecting mirrors 9a and 9b are ray separation units, and separate upper and lower oblique incident light beams from each other in the imaging optical system.

The photosensitive drum surfaces 12a and 12b are surfaces to be scanned in the first station S1. The photosensitive drum surfaces 12c and 12d are surfaces to be scanned in the second station S2. The reference numeral 20 represents the optical box 20.

For simpler description of functions of the optical scanning apparatus, an optical path of a light beam emitted from one light source unit 1a is described below.

In this embodiment, a light beam that has been optically modulated and emitted from the semiconductor laser 1a according to image information enters the corresponding anamorphic collimator lens 2a. The anamorphic collimator lens 2a converts the light beam emitted from the light source unit 1a into a parallel light beam within a main-scanning section (main-scanning direction) and converts a status of the light beam to be imaged on the deflecting surface 5a of the optical deflector 5 within a sub-scanning section (sub-scanning direction). The converted light beam is limited in light amount by the aperture stop 3a (partially shielded) to enter the deflecting surface 5a of the optical deflector 5.

The light beam that has entered the optical deflector 5 is deflected for scanning in a direction of the surface to be scanned by the deflecting surface 5a, and guided to the photosensitive drum surface 12a via the imaging optical system 6a. By rotating the optical deflector 5 in the arrow direction R, the photosensitive drum surface 12a is optically scanned in an arrow direction S (main-scanning direction). In this way, an image is recorded on the photosensitive drum surface 12a as a recording medium.

The synchronous detection unit (not shown) includes a BD optical system (synchronous detection optical system) and a BD sensor (synchronous detection sensor) for detecting a light. The BD optical system is disposed in a position through which the scanning light beam deflected for scanning by the optical deflector 5 passes, and includes a BD lens for guiding the light beam to the BD sensor when the optical deflector 5 is at a predetermined angle. The synchronous detection unit detects a timing at which the optical deflector 5 is at a predetermined angle in rotation during rotating in the arrow direction R, and outputs the timing to a control unit (not shown).

The control unit controls a rotational speed of the optical deflector 5 to a constant speed based on the timing output from the synchronous detection unit. The control unit also controls emission timings of the multiple light source units based on the timing.

In this embodiment, the first and second stations S1 and S2 are similar to each other in configuration and optical operation. Thus, the first station S1 is representatively described below. Members of the second station S2 similar to those of the first station S1 are bracketed. The members of the second station S2 are described when necessary.

In this embodiment, the incident optical systems La and Lb (Lc and Ld) are arranged vertically in two rows in the sub-scanning direction (not shown). Within the sub-scanning section, light beams from the two incident optical systems La and Lb (Lc and Ld) enter the deflecting surface 5a (5b) obliquely from upper and lower vertical directions (oblique incident optical systems). The two light beams that have entered the deflecting surface Sa (5b) obliquely are deflected for conical scanning in the upper and lower vertical directions by the optical deflector 5. The two light beams are separated by the ray separation unit 9a (9b) disposed in the imaging optical systems 6a and 6b (6c and 6d) and the two different photosensitive drum surfaces 12a and 12b (12c and 12d) are scanned with the respective separated two light beams as imaging spots.

In this embodiment, the two opposed stations S1 and S2 perform optical scanning by using the different deflecting surfaces 5a and 5b of the same optical deflector 5.

Thus, according to this embodiment, the multiple incident optical systems are configured by the oblique incident optical systems, and the multiple imaging optical systems are arranged to face the optical deflector 5, thereby sharing optical components. As a result, the entire optical scanning apparatus may be made compact.

This embodiment is directed to the optical scanning apparatus used for a color image forming apparatus that forms a color image by exposing the four photosensitive drums 12a to 12d with the scanning light beams and fixing the toner of four colors on paper. FIG. 1B illustrates the four photosensitive drums 12a to 12d for forming images of four color lights.

In FIG. 1B, from the right side, the yellow (Y) drum 12a, the magenta (M) drum 12b, the cyan (C) drum 12c, and the black (Bk) drum 12d are arranged. In this embodiment, the scanning light beams deflected for scanning by the rotational polygon mirror are guided to the respective photosensitive drums via the respective yellow (Y), magenta (M), cyan (C), and black (Bk) imaging optical systems.

Among the multiple photosensitive drums 12a to 12d, the magenta (M) and cyan (C) drums 12b and 12c physically closest to the optical deflector 5 are referred to as inner photosensitive drums with respect to the optical deflector 5. The yellow (Y) and black (Bk) drums 12a and 12d physically farthest from the optical deflector 5 are referred to as outer photosensitive drums with respect to the optical deflector 5.

In this embodiment, the incident optical systems La and Lb (Lc and Ld) cause two light beams emitted from the two light source units 1a and 1b (1c and 1d) separated from each other in the sub-scanning direction to enter the optical deflector 5 at angles of ±3 degrees obliquely in the sub-scanning direction. The two upper and lower scanning light beams that have been deflected by the optical deflector 5 pass through the common imaging lens 7ab (7cd), and then are separated by the reflecting mirror 9a (9b) to be guided to the two different photosensitive drums 12a and 12b (12c and 12d).

In this embodiment, by arranging the two stations S1 and S2 to oppose each other with the optical deflector 5 disposed therebetween, the light beams emitted from the four light source units 1a to 1d are guided to the four photosensitive drums 12a to 12d by use of one optical deflector.

The four photosensitive drums 12a to 12d correspond to four colors of yellow, magenta, cyan and black, and may form color images.

FIG. 1C is an enlarged view illustrating the main portion of the station S1 in the sub-scanning direction (sub-scanning sectional view) according to the first embodiment of the present invention. In FIG. 1C, members similar to those of FIG. 1B are denoted by similar reference symbols.

As illustrated in FIG. 1C, in this embodiment, within the sub-scanning section, the multiple (two) scanning light beams that have been deflected by the optical deflector 5 pass through the common imaging lens 7ab through different positions in the sub-scanning direction displaced vertically upper and lower with respect to a profile center C of the common imaging lens 7ab.

An optical path of a scanning light beam guided to the inner photosensitive drum 12b with respect to the optical deflector 5 is described below.

The scanning light beam guided to the inner photosensitive drum 12b passes through the imaging lens 7ab through a lower part with respect to the profile center C of the imaging lens 7ab, in other words, through a position displaced toward the photosensitive drum 12b side.

The imaging lens 7ab is defined as an imaging optical element G1 (or imaging lens G1), and the scanning light beam guided to the inner photosensitive drum 12b is defined as a light beam Ray1.

In the sub-scanning direction, one of two lens edge surfaces of the imaging lens G1, which is closer to a passing position of the light beam Ray1 is defined as an edge surface A, and the other lens edge surface of the imaging lens G1, which is farther from a passing position of the light beam Ray1 is defined as an edge surface B.

In this case, the lens edge surface of the imaging lens G1 which is nearer to the passing position of the imaging lens G1 of the light beam Ray1, in other words, a lens edge surface of the imaging lens G1 in the photosensitive-drum side (lens bottom edge in FIG. 1B), is the edge surface A.

A lens edge surface which is farther to the passing position of the light beam Ray1, in other words, a lens edge surface of the imaging lens G1 far from the photosensitive drum 12b (lens top edge in FIG. 1B), is the edge surface B.

A reflecting mirror which the light beam Ray1 having passed through the imaging lens G1 first enters is defined as a first reflecting mirror M1, and a mirror that reflects the reflected light beam from the first reflecting mirror M1 is defined as a second reflecting mirror M2.

In FIGS. 1B and 1C, the reflecting mirror 9a is the first reflecting mirror M1, and the reflecting mirror 10a is the second reflecting mirror M2. In this embodiment, the light beam Ray1 after passing through the imaging lens G1 is reflected by the first reflecting mirror M1, and an optical path is folded to extend between the imaging lens G1 and the photosensitive drum 12b, in other words, toward the lens edge surface A side. Then, the light beam reflected by the first reflecting mirror M1 is reflected by the second reflecting mirror M2 to be guided to the photosensitive drum 12b.

Figure 4:
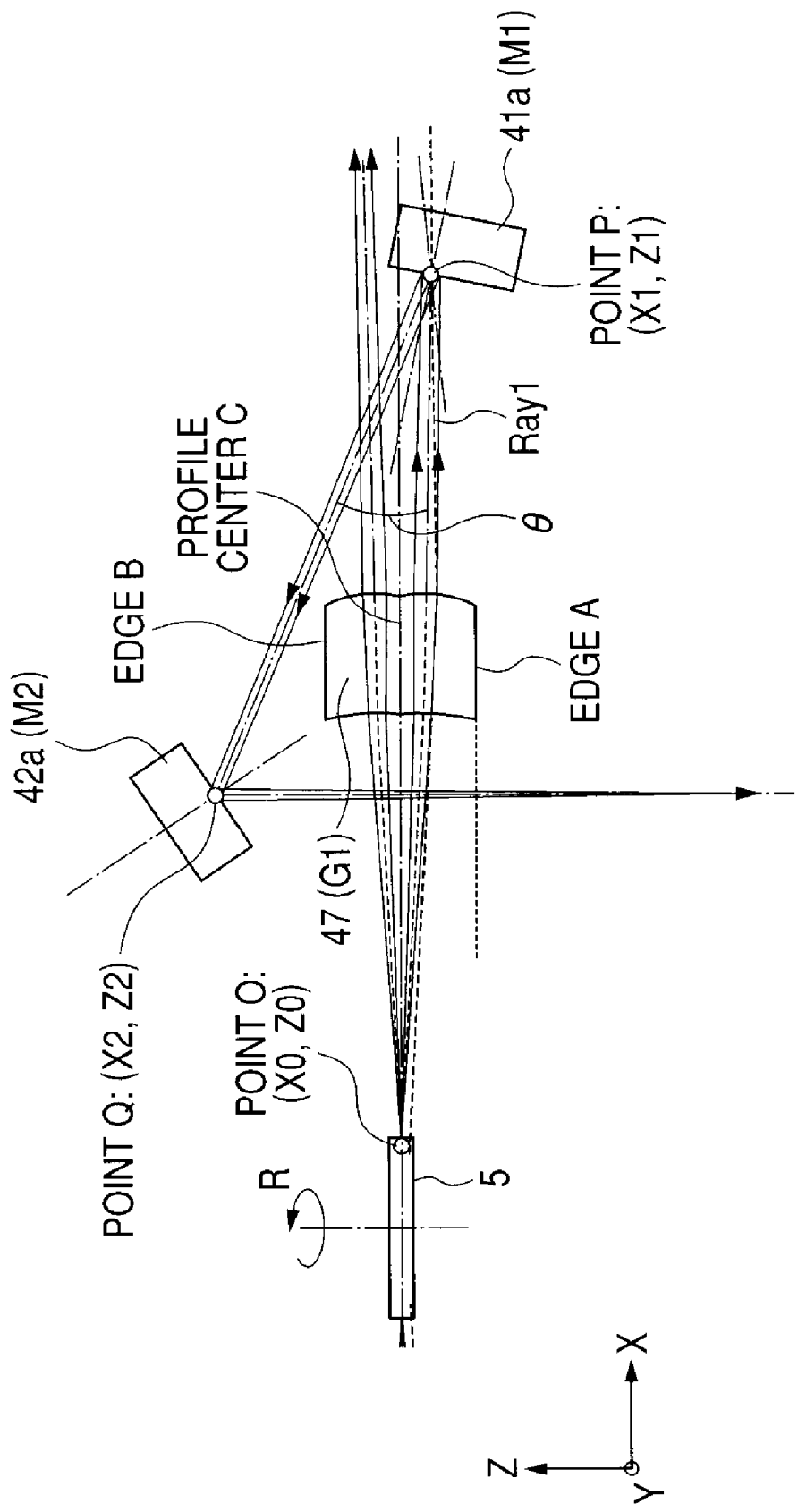
FIG. 4 is a sub-scanning sectional view according to a comparative example.

In this embodiment, by setting the imaging lens G1 and the first reflecting mirror M1 as described above, a height of the optical box 20 is reduced. Referring to FIG. 4, a reason is described.

FIG. 4 illustrates a comparative example of this embodiment.

In FIG. 4, as same as in the case of this embodiment, a lens edge surface (lens bottom edge in FIG. 4) which is nearer to a passing position of a light beam Ray1, in other words, which is near the photosensitive drum, is defined as an edge surface A. A lens surface (lens top edge in FIG. 4) which is farther to a passing position of the light beam Ray1, in other words, which is far from the photosensitive drum, is defined as an edge surface B.

The comparative example of FIG. 4 is different from this embodiment in that the light beam Ray1 after passing through the imaging lens G1 (imaging lens 47 in FIG. 4) is reflected by the first reflecting mirror M1 (reflecting mirror 41a in FIG. 4), and the optical path is folded to an upper part of the lens in FIG. 4, in other words, toward the lens edge surface B side.

In FIG. 4, because a reflection point P of the first reflecting mirror M1 is located on the edge surface A side, an angle θ has to be set large to prevent the reflected light beam from being vignetted by the imaging lens G1. As a result, in the comparative example, a reflection point Q of the second reflecting mirror M2 (reflecting mirror 42a in FIG. 4) is farther from the imaging lens G1, increasing a height-direction width of the optical box to contain the imaging optical system.

An optical axis direction of the imaging optical system is defined as an X axis, a rotational axis direction of the optical deflector is defined as a Z axis, and coordinates (X0, Z0) of a deflection-for-scanning point O when the light beam Ray1 is guided to an axial image height are set as an origin (X, Z)=(0, 0).

In FIG. 4, the coordinates of the reflection point P of the first reflecting mirror M1 are (X, Z)=(70.0, −2.6), and an angle θ between a principal ray of the reflected light beam from the first reflecting mirror M1 and the X axis is 22.6 degrees, which is large. The coordinates of the reflection point Q of the second reflecting mirror M2 are (X, Z)=(28.6, 14.7), which is greatly separated upward from the optical axis in the Z direction.

Thus, in this embodiment, by setting a reflection direction of the first reflecting mirror M1 to the edge surface A side, the angle θ necessary for preventing the reflected light beam from being vignetted by the imaging lens G1 is set smaller than that in the comparative example. In this way, according to this embodiment, the reflection point Q of the second reflecting mirror M2 may be set in a position closer to the imaging lens G1, and a height-direction (sub-scanning direction) width of the optical box 20 may be reduced.

In FIG. 1C, the coordinates of the reflection point P of the first reflecting mirror M1 are (X, Z)=(70.0, −2.6), and an angle θ between a principal ray of the reflected light beam from the first reflecting mirror M1 and the X axis may be set to 12.1 degrees, which is smaller than that of the comparative example. The coordinates of the reflection point Q of the second reflecting mirror M2 are (X, Z)=(28.6, 11.4), showing that a Z-direction interval from the optical axis may be reduced.

In the optical box of the scanning optical system, when the reflecting mirror is disposed in the top or bottom edge in the optical box, if a short-direction width of the reflecting mirror is reduced, a height of the optical box may be lowered correspondingly.

However, there is also a trade-off problem as follows. The backside surface or the front surface of the reflecting mirror is abutted on a reference surface of the optical box to obtain an accuracy in arrangement of the reflecting mirror in an inclination direction, and hence, if the short-direction width of the mirror is reduced, the accuracy in arrangement of the reflecting mirror in the inclination direction is reduced correspondingly. As a result, the position to be scanned on the photosensitive drum may displace, to thereby deteriorate an image.

Thus, in this embodiment, in the optical axis direction of the imaging optical system, the second reflecting mirror M2 is disposed between the optical deflector 5 and the imaging lens G1, and a part of the second reflecting mirror M2 is present in a plane which is the extension of the edge surface A of the imaging lens G1.

This configuration enables utilizable the space between the optical deflector 5 and the imaging lens G1 which has conventionally been vacant. Without extending the mirror downward, a sufficient short-direction width of the second reflecting mirror M2 may be secured. In addition, sufficient accuracy in arrangement of the second reflecting mirror M2 in an inclination direction may be secured. Thus, according to this embodiment, a height of the optical box 20 may be set small, and a good image may be obtained.

In this embodiment, an interval in an optical axis direction from a deflection-for-scanning point O to a lens surface on the surface-to-be-scanned side of the imaging lens G1 when the light beam Ray1 is guided to the axial image height is set to L1 (mm), and an interval in the optical axis direction from the deflection-for-scanning point O to the reflection point P of the first reflecting mirror M1 is set to L2 (mm). An oblique incident angle of the light beam Ray1 in the sub-scanning direction is set to α (degree), and an interval between the deflection-for-scanning point O and the profile center C of the imaging lens G1 in the sub-scanning direction is set to σ (mm).

In this case, the following values are set:

L1=44.4 (mm), L2=70.0 (mm), α=3 (degree), and σ=0 (mm)

As described above, when a lens height of the imaging lens G1 is set to h (mm) and an angle between the principal ray of the reflected light beam Ray1 from the first reflecting mirror M1 and a plane orthogonal to the rotational axis of the optical deflector in the sub-scanning direction is set to θ (degree), the following values are set:

h=12 (mm), θ=12.1 (degree)

In this embodiment, an arrangement angle of the first reflecting mirror M1 is set so that the angle θ satisfies the following conditional expression (1):

$$ATAN\left[\frac{\{0.55 \times h - L2 \times \tan(\alpha) - \sigma\}}{L2 - L1}\right] < \qquad (1)$$
$$\theta < ATAN\left[\frac{\{h - L2 \times \tan(\alpha) - \sigma\}}{L2 - L1}\right]$$

In this embodiment, based on each values described above, a left side of the conditional expression (1) is:

$$ATAN\left[\frac{\{0.55 \times h - L2 \times \tan(\alpha) - \sigma\}}{L2 - L1}\right] = 6.5 \; deg$$

A right side of the conditional expression (1) is:

$$ATAN\left[\frac{\{h - L2 \times \tan(\alpha) - \sigma\}}{L2 - L1}\right] = 18.0 \; deg$$

The conditional expression (1) is an approximate expression representing a relationship between a beam passing height and the angle θ when the reflected light beam Ray1 from the first reflecting mirror M1 passes through the lower side of the lens surface on the surface-to-be-scanned side of the imaging lens G1.

When the angle θ is smaller than or equal to the lower limit of the conditional expression (1), the reflected light beam Ray1 from the first reflecting mirror M1 is not sufficiently separated from the imaging lens G1 so that the light beam may be vignetted. When the angle θ is larger than or equal to the upper limit of the conditional expression (1), the second reflecting mirror M2 is greatly separated from the imaging lens G1, increasing a height-direction width of the optical box.

Thus, in this embodiment, an arrangement angle of the first reflecting mirror M1 is set so that a value of the angle θ may satisfy the conditional expression (1), in other words, 6.5 (degrees)<θ<18.0 (degrees), thereby preventing the light beam from the first reflecting mirror M1 from interfering with the imaging lens G1. Further, the second reflecting mirror M2 is disposed between the optical deflector 5 and the imaging lens G1 to reduce a height of the optical box 20.

In this embodiment, an oblique incident angle of the light beam Ray1 in the sub-scanning direction is set so that the light beam Ray1 deflected for scanning by the optical deflector 5 may be guided for conical scanning in a direction in which the light beam Ray1 approaches the edge surface A.

According to the embodiment, such setting enables to configure the reflection point P of the first reflecting mirror M1 near to the edge surface A side, reduce the angle θ, and prevent the reflected light beam Ray1 from the first reflecting mirror M1 from being vignetted by the imaging lens G1. As a result, this embodiment provides an effect of reducing the width of the optical box 20 in a height-direction (sub-scanning-direction).

In the imaging optical system of this embodiment, the projections of all the imaging lenses and all the mirrors onto a main-scanning section do not overlap one another (in vertical direction). Thus, optical components may be easily incorporated in the optical box, and assembling tools may be easily configured. Advantages such as high work efficiency may be provided, whereby facilitating assembling.

In this embodiment, setting the folded optical path as described above enables to reduce the height of the optical box, and the imaging optical system may be configured by only two reflecting mirrors for one optical path. Thus, the height of the optical box may be reduced, providing a simple optical box.

In this embodiment, the optical path directed to the outer photosensitive drum 12a (12d) is folded by only one reflecting mirror 11a (11b). Thus, the optical box of this embodiment may be configured by only six reflecting mirrors, whereby providing a simple optical box.

In this embodiment, the reflecting mirrors are set so that optical path lengths of the optical paths directed to the inner photosensitive drums 12b and 12c may match those directed to the outer photosensitive drums 12a and 12d. Thus, fθ coefficients may be set equal with respect to the inner photosensitive drums and the outer photosensitive drums, whereby enabling formation of a good image without any electric correction.

In this embodiment, the four photosensitive drums 12a to 12d are set equal to one another in height (height-direction positions on the surface to be scanned).

In this embodiment, to simplify the entire apparatus, the number of imaging lenses disposed in the optical paths of the imaging optical systems 6a to 6d is only one.

Configuring the imaging optical system by only one imaging lens necessitates an increase in thickness of the imaging lens. In the case of a large thickness of an imaging lens, a height-direction width of the imaging lens has to be set large to suppress the imaging performance deterioration due to birefringence.

In this embodiment, therefore, a size of the imaging lens is large as follows:

Thickness d=9.6 (mm), and lens height h=12 (mm)

In the case of such a lens of a large thickness and a large height-direction size, the optical path of the scanning optical system has to greatly bypass the lens, so that it becomes difficult to downsize the optical box.

Thus, in this embodiment, arranging the imaging lens and the reflecting mirror in the aforementioned manner, the optical box can be downsized while avoiding the light beam to interfere with the imaging lens.

In the case of holding the reflecting mirror in the optical box, if the backside surface (backside of the reflection surface) of the reflecting mirror abuts the reference surface of the optical box to hold the reflecting mirror, a reflecting position may be displaced due to an error in thickness of the reflecting mirror, and therefore the scanning position on the surface to be scanned may be displaced, whereby leading to image deterioration.

Thus, according to this embodiment, the reflection surfaces of all the reflecting mirrors are set downward so that all the reflecting mirrors may be held in an abutting manner by the reflection surfaces thereof. In other words, within the sub-scanning section, the reflection surfaces of the first and second reflecting mirrors M1 and M2 are arranged to face the surface to be scanned. As a result, the accuracy in arrangement of the reflecting mirrors may be improved, to thereby prove a good image.

In this embodiment, the reflecting mirrors are set so that the light beam having passed through the imaging lens G1 and guided to the inner photosensitive drum 12b (12c) and the light beam having passed through the imaging lens G1 and guided to the outer photosensitive drum 12a (12d) do not intersect each other. With this setting, the light beam guided to the inner photosensitive drum 12b (12c) is difficult to reach the outer photosensitive drum 12a (12d), to thereby provide an effect of preventing deterioration of an image caused by an unnecessary ghost light.

In this embodiment, as illustrated in the drawing, the optical box is disposed in the upper part, and the photosensitive drums are disposed in the lower part, whereby light beams are guided for scanning on the top surfaces of the photosensitive drums. However, the present invention is not limited thereto. The photosensitive drums may be disposed in the upper part, and the optical box may be disposed in the lower part, whereby light beams are guided for scanning on the bottom surfaces of the photosensitive drums. Further, the light beam passed through the imaging lens G1 may be folded by the reflecting mirror as described above. Effects of the present invention may be satisfactorily obtained as well in this way.

In this embodiment, the imaging lens G1 is an integrally molded resin lens. However, as long as optical performance is obtained, for example, the imaging lens G1 can be constituted by stacking two glass lenses in two stages.

In this embodiment, as described above, the two light beams deflected for scanning by the optical deflector 5 pass through the imaging lens G1 through the different positions (areas) of the imaging lens G1 in the sub-scanning direction. The light beam Ray1 passed through the imaging lens G1 through the position closest to the edge surface A of the imaging lens G1 is set to fold its optical path toward the edge surface A side by the first reflecting mirror M1.

In this embodiment, with this configuration, an angle between the light beam reflected by the first reflecting mirror M1 and the optical axis of the imaging optical system may be set smaller, to thereby provide an effect of reducing the height of the optical box.

In this embodiment, one of the two upper and lower light beams deflected for scanning by the optical deflector 5 is set in a direction in which the light beam is closest to the edge surface A as described above. In other words, the light beam Ray1 reflected downward is set, after passing through the imaging lens G1, to fold its optical path toward the edge surface A side by the first reflecting mirror M1.

With this configuration, the angle between the light beam reflected by the first reflecting mirror M1 and the optical axis of the imaging optical system is set smaller, to thereby provide the effect of reducing the height of the optical box.

In this embodiment, in the optical scanning apparatus in which the multiple light beams reflected by one optical deflector 5 are guided to the multiple corresponding photosensitive drums 12a to 12d, the optical path lengths of the multiple optical paths are made same as each other by using the common imaging lenses.

In such a case, the optical path lengths of the optical paths to the photosensitive drums 12b and 12c that are closest to the optical deflector (inner side) have to be increased. The optical paths to the photosensitive drums 12b and 12c that are closest to the optical deflector need divert in the vertical direction (sub-scanning direction) so that the optical paths do not interfere with other optical components such as the imaging lens. Thus, the diverting of the optical paths to the photosensitive drums 12b and 12c that are closest to the optical deflector causes that the height of the optical box cannot be reduced.

Thus, according to this embodiment, for the optical paths of the light beam Ray1 guided to the photosensitive drums 12b and 12c that are closest to the optical deflector, the height-direction width (sub-scanning-direction width) of the optical path of the light beam Ray1 is reduced by employing the aforementioned configuration of this embodiment. In this way, the effect of reducing the height of the optical box may be obtained.

In the optical box that uses multiple reflecting mirrors, positions of the reflecting mirrors mainly determine a height-direction width of the optical box. Thus, if the reflecting mirrors are separated from one another in the height direction of the optical box, a height-direction width of the optical box becomes larger.

Thus, according to this embodiment, the projections of the first and second reflecting mirrors M1 and M2 within the sub-scanning section overlap each other, thereby reducing the height-direction width of the optical box.

In this embodiment, the two reflecting mirrors M1 and M2 are arranged on the optical path of the light beam Ray1. Another reflecting mirror may be disposed as a third reflecting mirror for further reflecting the light beam Ray1 reflected by the second reflecting mirror M2 and guiding the reflected light beam Ray1 to the photosensitive drum.

Second Embodiment

Figure 2A:
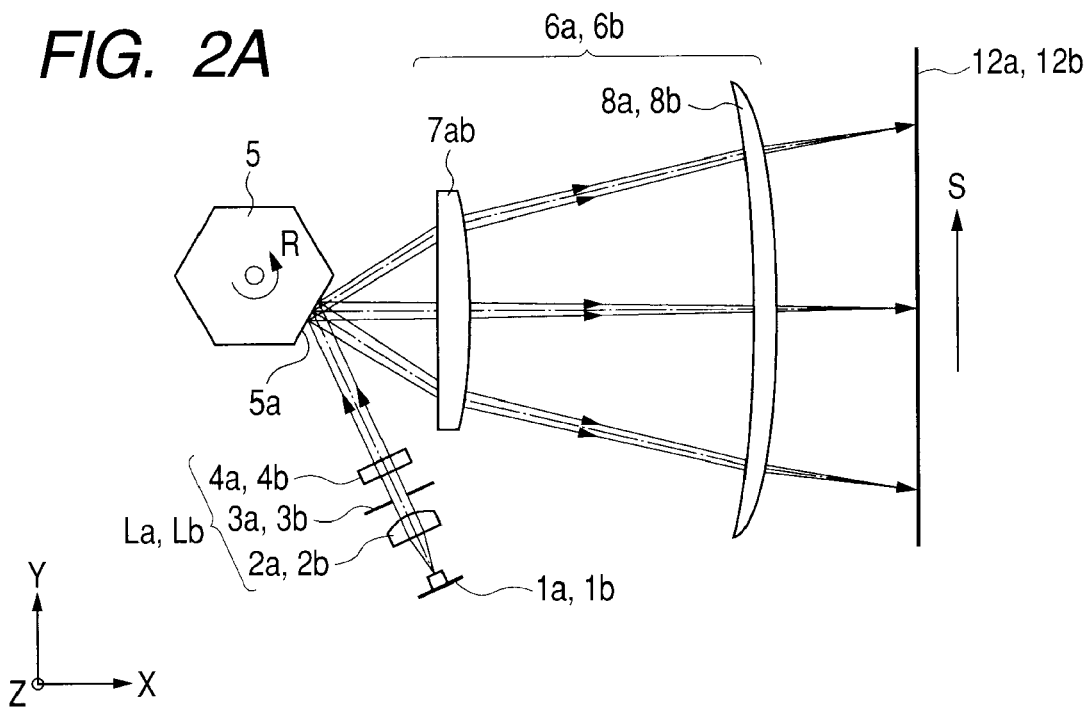
FIG. 2A is a main-scanning sectional view according to a second embodiment of the present invention.
Figure 2B:
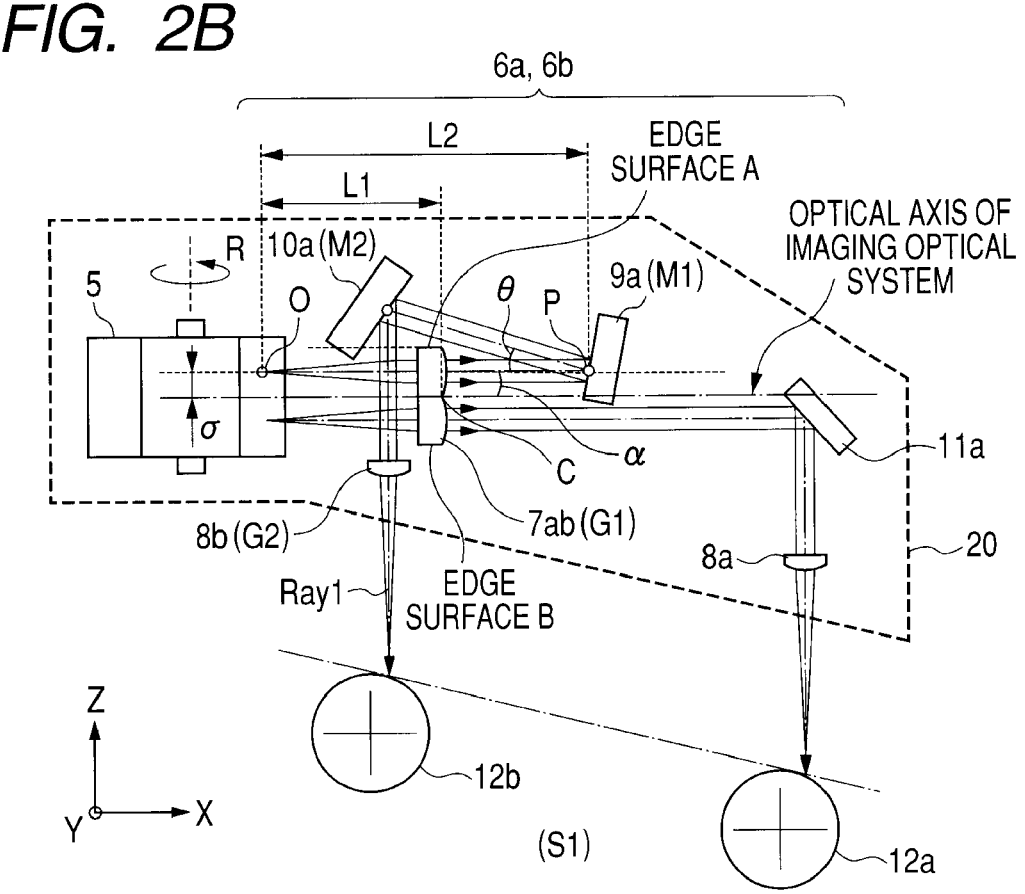
FIG. 2B is a sub-scanning sectional view according to the second embodiment of the present invention.

FIG. 2A is a main portion sectional view (main-scanning sectional view) in a main-scanning direction according to a second embodiment of the present invention, and FIG. 2B is a main portion sectional view (sub-scanning sectional view) in a sub-scanning direction according to the second embodiment of the present invention. In FIGS. 2A and 2B, components similar to those of FIGS. 1A and 1C are denoted by similar reference symbols.

The second embodiment is different from the first embodiment in that only one station S1 is used with respect to an optical deflector 5, and that within the sub-scanning section, two light beams emitted from two light source units 1a and 1b enter the optical deflector 5 perpendicularly to a rotational axis of the optical deflector 5. Other configuration and optical operations are similar to those of the first embodiment, thereby obtaining similar effects.

In the drawing, the collimator lenses 2a and 2b convert light beams emitted from the corresponding light source units 1a and 1b into parallel light beams. The cylindrical lenses 4a and 4b have predetermined powers only in the sub-scanning section.

As in the first embodiment, the collimator lenses 2a and 2b and the cylindrical lenses 4a and 4b may be configured by one optical element (anamorphic lens). The components such as the collimator lenses 2a and 2b, aperture stops 3a and 3b, and the cylindrical lenses 4a and 4b constitute one component of incident optical systems La and Lb.

The optical deflector (polygon mirror) 5 as a deflection unit having six deflecting surfaces is rotated at a constant speed in an arrow direction R of FIGS. 2A and 2B by a driving unit such as a motor (not shown).

In this embodiment, a polygon mirror (rotational polygon mirror), which is wide and thick in a height direction (sub-scanning direction) thereof, is used.

The imaging optical systems 6a and 6b image multiple light beams from the optical deflector 5 on the surfaces to be scanned 12a and 12b corresponding to the respective light beams.

In this embodiment, the multiple imaging optical systems 6a and 6b include a first imaging lens 7ab commonly used by the imaging optical systems 6a and 6b, and two second imaging lenses 8a and 8b different between the imaging optical systems 6a and 6b.

The mirrors (reflecting mirrors) 9a, 10a and 11a as reflection elements fold the optical paths in the station S1. The reflecting mirror 9a serving as a ray separation unit separates upper and lower oblique incident light beams from each other in the imaging optical system.

In this embodiment, the present invention is applied to an optical scanning apparatus that uses only one station S1 with respect to the optical deflector 5. The optical scanning apparatus of this embodiment is constituted by, as illustrated in FIG. 2B, a so-called in-deflecting surface incident optical system in which two light beams separated from each other in the sub-scanning direction are made incident on the optical deflector 5 perpendicularly to the rotational axis of the optical deflector 5.

In the optical scanning apparatus of the first embodiment, four photosensitive drums are scanned by use of the two stations in each of which the two upper and lower light beams are deflected toward both sides for scanning by the one optical deflector. On the other hand, in the optical scanning apparatus of the second embodiment, two photosensitive drums are scanned by use of one station in which the two upper and lower light beams are deflected toward one side for scanning by one optical deflector. The two photosensitive drums respectively correspond to two colors of, for example, yellow (Y) and magenta (M), and may form a color image.

In this embodiment, as illustrated in FIG. 2B, within the sub-scanning section, two scanning light beams deflected for scanning by the optical deflector 5 pass through the first imaging lens 7ab through positions displaced in the sub-scanning direction in upper and lower directions with respect to a profile center C of the first imaging lens 7ab.

Next, an optical path of a scanning light beam guided to the inner photosensitive drum 12b with respect to the optical deflector 5 is described.

The first imaging lens 7ab is defined as an imaging lens (imaging optical element) G1, and a scanning light beam guided to the inner photosensitive drum 12b with respect to the optical deflector 5 is defined as a light beam Ray1.

The light beam Ray1 passes through the imaging lens G1 through a position displaced in the sub-scanning direction in the upper direction with respect to the profile center C of the imaging lens G1.

In the sub-scanning direction, a lens edge surface of the imaging lens G1 which is close to a passing position of the light beam Ray1 is defined as an edge surface A, and the other lens edge surface of the imaging lens G1 which is far from the passing position of the light beam Ray1 is defined as an edge surface B.

In this case, the lens edge surface of the imaging lens G1 which is close to the passing position of the light beam Ray1, in other words, an edge surface (lens upper edge in FIG. 2B) far from the photosensitive drum, is the edge surface A. The lens edge surface (lens lower edge in FIG. 2B) which is far from the passing position of the scanning light beam, in other words, a lens edge surface on the photosensitive-drum side, is the edge surface B.

A reflecting mirror which the light beam Ray1 having passed through the imaging lens G1 first enters is defined as a first reflecting mirror M1, and a mirror that reflects the reflected light beam from the first reflecting mirror M1 is defined as a second reflecting mirror M2.

In this case, the reflecting mirror 9a is the first reflecting mirror M1, and the reflecting mirror 10a is the second reflecting mirror M2. In this embodiment, the light beam Ray1 passed through the imaging lens G1 is reflected by the first reflecting mirror M1, and the optical path is folded toward the upper side of the imaging lens G1, in other words, toward the lens edge surface A side. Then, the reflected light beam from the first reflecting mirror M1 is reflected by the second reflecting mirror M2 to be guided to the photosensitive drum 12b.

In this embodiment, the imaging lens G1 and the first reflecting mirror M1 are set in this way so that the height of the optical box is reduced as in the first embodiment.

In this embodiment, the second reflecting mirror M2 is disposed between the optical deflector 5 and the imaging lens G1 in the optical axis direction of the imaging optical system, and a part of the second reflecting mirror M2 is present in a plane which is an extension of the edge surface A of the imaging lens G1.

Configuring as described above, a space between the optical deflector 5 and the imaging lens G1 which has conventionally been vacant can be utilized. Without extending the mirror upward in the sub-scanning direction, a sufficient short-direction width of the second reflecting mirror M2 may be secured. In addition, sufficient accuracy in arrangement of the second reflecting mirror M2 in an inclination direction may be secured. Thus, according to this embodiment, the height of the optical box may be set low, and a good image may be obtained.

An interval L1 (mm) in an optical axis direction between a deflection-for-scanning point O and a lens surface (optical surface) on the surface-to-be-scanned side of the imaging lens G1 when the light beam Ray1 is guided to the axial image height is set as follows. An interval L2 (mm) in the optical axis direction between the deflection-for-scanning point O and the reflection point P of the first reflecting mirror M1 is set as follows. An oblique incident angle α (degree) of the principal ray of the light beam Ray1 in the sub-scanning direction is set as follows. An interval σ (mm) in the sub-scanning direction between the deflection-for-scanning point O and the profile center C of the imaging lens G1 is set as follows.

L1=32.0 (mm), L2=56.0 (mm), α=0 (degrees), and σ=4 (mm)

A lens height h (mm) of the imaging lens G1 (height of optical element) and an angle θ (degree) in the sub-scanning direction between the principal ray of the reflected light beam Ray1 from the first reflecting mirror M1 and a plane orthogonal to the rotational axis of the optical deflector are set as follows.

h=16 (mm), and θ=18.0 (degrees)

In this embodiment, an arrangement angle of the first reflecting mirror M1 is set so that the angle θ satisfies the above-mentioned conditional expression (1).

In this embodiment, based on the values described above, a left side of the conditional expression (1) is:

$$ATAN\left[\frac{\{0.55 \times h - L2 \times \tan(\alpha) - \sigma\}}{L2 - L1}\right] = 11.3 \ deg$$

A right side of the conditional expression (1) is:

$$ATAN\left[\frac{\{h - L2 \times \tan(\alpha) - \sigma\}}{L2 - L1}\right] = 26.7 \ deg$$

In this embodiment, the arrangement angle θ of the first reflecting mirror M1 is set so that the angle θ satisfies the conditional expression (1):

11.3 (degrees)<θ<26.7 (degrees)

Thus, no interference occurs between the light beam from the first reflecting mirror M1 and the imaging lens G1, and the second reflecting mirror M2 is disposed between the optical deflector and the imaging lens G1 to reduce the height of the optical box.

While the imaging optical system according to the first embodiment includes only one imaging lens, the imaging optical system according to the second embodiment includes two imaging lenses, thereby further improving imaging performance. In the optical path of the light beam Ray1 guided to the inner photosensitive drum 12b, the reflected light beam from the second reflecting mirror M2 passes through the second imaging lens G2 (imaging lens 8b in FIG. 2B).

Figure 3A:
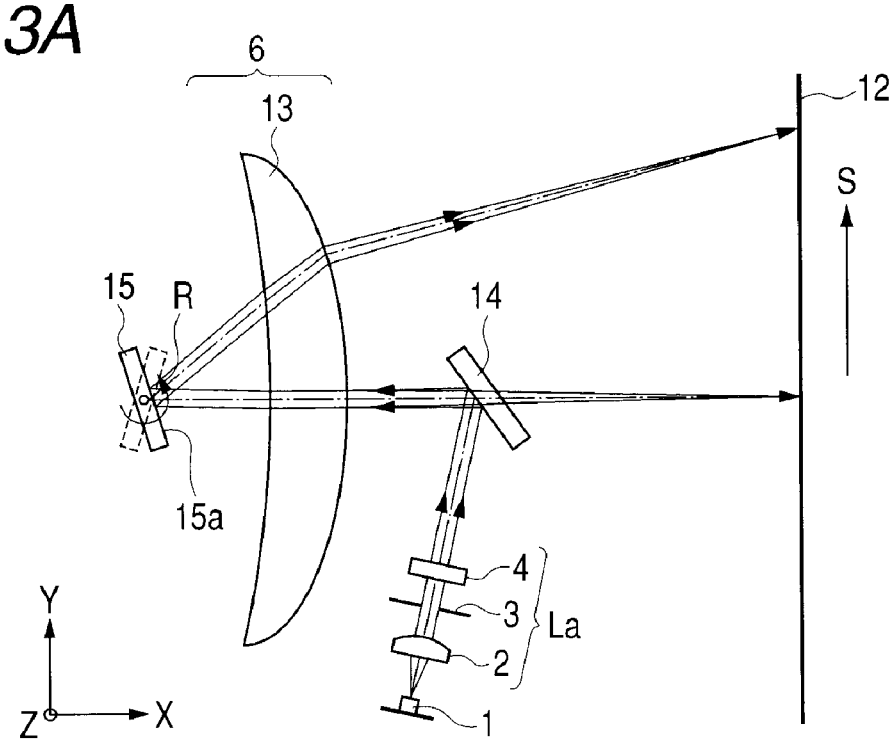
FIG. 3A is a main-scanning sectional view according to a third embodiment of the present invention.
Figure 3B:
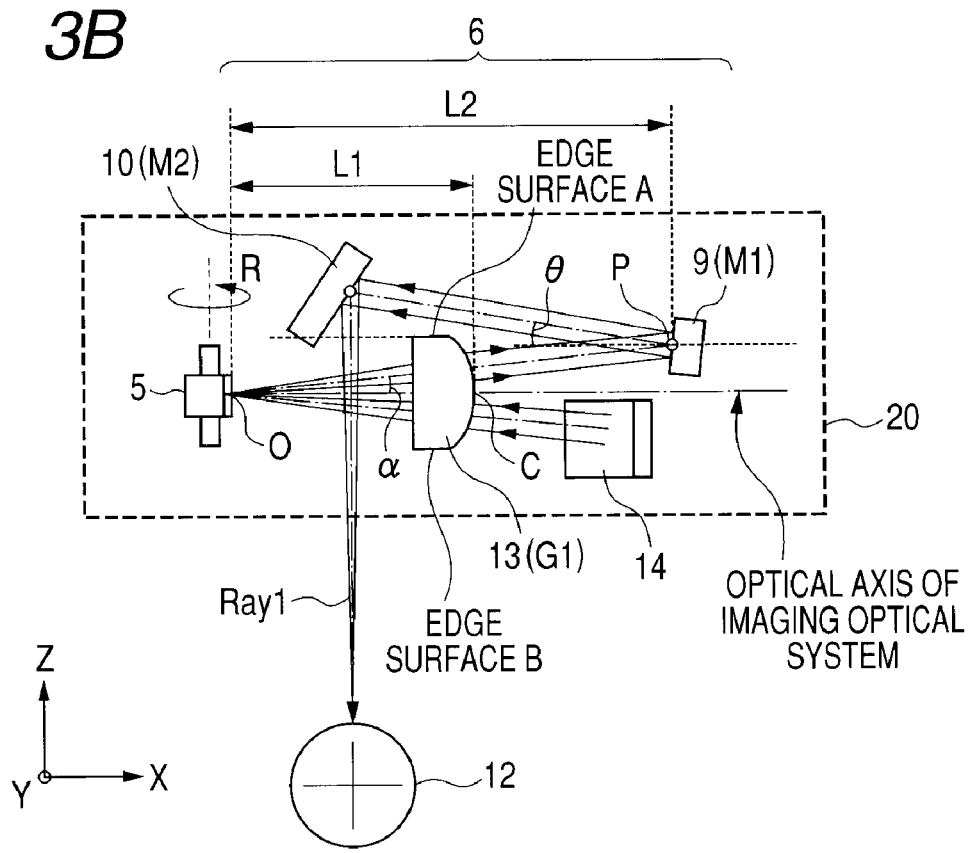
FIG. 3B is a sub-scanning sectional view according to the third embodiment of the present invention.

In this embodiment, an image of two colors is formed by scanning the two photosensitive drums with the two upper and lower light beams guided on one side with respect to one optical deflector. Alternatively, four upper and lower light beams may be guided for scanning guided onto the four photosensitive drums Third Embodiment FIG. 3A is a main portion sectional view (main-scanning sectional view) in a main-scanning direction according to a third embodiment of the present invention, and FIG. 3B is a main portion sectional view (sub-scanning sectional view) in a sub-scanning direction according to the third embodiment of the present invention. In FIGS. 3A and 3B, components similar to those of FIGS. 1A and 1C are denoted by similar reference symbols.

The third embodiment is different from the second embodiment in that the present invention is applied to a single-beam optical system including single light source unit 1, that an oscillation mirror 15 is used as a deflection unit, and that a double-path configuration using an imaging lens 13 as a part of an incident optical system La is employed. Other configuration and optical operations are similar to those of the second embodiment, obtaining similar effects.

In FIG. 3A, the light source unit 1 includes, for example, a semiconductor laser, and a collimator lens 2 converts a light beam emitted from the light source unit 1 into a parallel light beam. An aperture stop 3 restricts a passing light beam to shape a beam. A cylindrical lens 4 has a predetermined power only within a sub-scanning section (in a sub-scanning direction), and images the light beam passed through the collimator lens 2 as a linear image on a deflecting surface 15a of the optical deflector 15 described below within the sub-scanning section. The optical scanning apparatus includes a folding mirror 14.

As in the first embodiment, the collimator lens 2 and the cylindrical lens 4 may be configured by one optical element (anamorphic lens). The components such as the collimator lens 2, the aperture stop 3, and the cylindrical lens 4 constitute one component of the incident optical system La.

The oscillation mirror 15 as a deflection unit oscillates in an arrow direction R of FIGS. 3A and 3B at a constant speed by a driving unit such as a motor (not shown). An imaging optical system 6 having fθ characteristics includes a single imaging lens 13. This embodiment employs a double-path configuration in which a lower part of the imaging lens 13 is used as a part of the incident optical system La. Within the sub-scanning section, the light beam enters the oscillation mirror 15 at a certain angle in the sub-scanning direction so as to separate an incident light beam and exit light beams from each other in the imaging lens 13.

A surface of a photosensitive drum 12 (recording medium surface) is a surface to be scanned.

In the second embodiment, the two light beams guided to the different photosensitive drums 12a and 12b pass through the common first imaging lens 7ab. On the other hand, in the third embodiment, only the light beam which is guided to one photosensitive drum 12 passes through the single imaging lens 13. The one photosensitive drum 12 corresponds to black (BK), and forms a monochrome image.

The imaging lens 13 is defined as an imaging lens (imaging optical element) G1, and a scanning light beam guided to the photosensitive drum 12 is defined as a light beam Ray1.

As illustrated in FIG. 3B, in this embodiment, within the sub-scanning section, the light beam Ray1 from the optical deflector 5 passes through the imaging lens G1 through a upper position with respect to a profile center C of the imaging lens G1 in the sub-scanning direction.

Further, in the sub-scanning direction, a lens edge surface of the imaging lens G1 which is close to a passing position of the light beam Ray1 is defined as an edge surface A, and the other lens edge surface of the imaging lens G1 which is far from the passing position of the light beam Ray1 is defined as an edge surface B.

In this case, the lens edge surface of the imaging lens G1 which is close to the passing position of the light beam Ray1, in other words, a lens edge surface (lens upper edge in FIG. 3B) which is far from the photosensitive drum 12, is the edge surface A. The lens edge surface (lens lower edge in FIG. 3B) which is far from the passing position of the light beam Ray1, in other words, a lens edge surface which is on the photosensitive-drum side, is the edge surface B.

A reflecting mirror which the light beam Ray1 having passed through the imaging lens G1 first enters is defined as a first reflecting mirror M1, and a mirror that reflects the reflected light beam from the first reflecting mirror M1 is defined as a second reflecting mirror M2.

In this case, a reflecting mirror 9 is the first reflecting mirror M1, and a reflecting mirror 10 is the second reflecting mirror M2. In this embodiment, the light beam Ray1 having passed through the imaging lens G1 is reflected by the first reflecting mirror M1, and an optical path is folded toward the upper side of the imaging lens G1, in other words, the lens edge surface A side. Then, the reflected light beam from the first reflecting mirror M1 is reflected by the second reflecting mirror M2 to be guided to the photosensitive drum 12.

In this embodiment, the imaging lens G1 and the first reflecting mirror M1 are set in this way so that the height of the optical box is reduced as in the second embodiment.

In this embodiment, in the optical axis direction of the imaging optical system 6, the second reflecting mirror M2 is disposed between the optical deflector 5 and the imaging lens G1, and a part of the second reflecting mirror M2 is present in a plane of an extension of the edge surface A of the imaging lens G1.

Configuring as described above, a space between the optical deflector 5 and the imaging lens G1 which has conventionally been vacant can be utilized. Without extending the mirror upward in the sub-scanning direction, a sufficient short-direction width of the second reflecting mirror M2 may be secured. In addition, sufficient accuracy in arrangement of the second reflecting mirror M2 in an inclination direction may be secured. Thus, according to this embodiment, the height of an optical box 20 may be set small, and a good image may be obtained.

An interval L1 (mm) in an optical axis direction from a deflection-for-scanning point O to a lens surface on the surface-to-be-scanned side of the imaging lens G1 when the light beam Ray1 is guided to the axial image height is set as follows. An interval L2 (mm) in the optical axis direction between the deflection-for-scanning point O and the reflection point P of the first reflecting mirror M1 is set as follows. An oblique incident angle α (degree) of the principal ray of the light beam Ray1 in the sub-scanning direction is set as follows. An interval σ (mm) in the sub-scanning direction between the deflection-for-scanning point O and the profile center C of the imaging lens G1 is set as follows.

L1=40.0 (mm), L2=70.0 (mm), α=6 (degrees), and σ=0 (mm)

A lens height h (mm) of the imaging lens G1 and an angle θ (degree) in the sub-scanning direction between the principal ray of the reflected light beam Ray1 from the first reflecting mirror M1 and a plane orthogonal to the rotational axis of the optical deflector are set as follows:

h=18 (mm), and θ=10.0 (degrees)

In this embodiment, an arrangement angle of the first reflecting mirror M1 is set so that a value of the angle θ satisfies the above-mentioned conditional expression (1).

In this embodiment, based on the values described above, a left side of the conditional expression (1) is:

$$\mathrm{ATAN}\left[\frac{\{0.55 \times h - L2 \times \tan(\alpha) - \sigma\}}{L2 - L1}\right] = 4.8 \ deg$$

A right side of the conditional expression (1) is:

$$ATAN\left[\frac{\{h - L2 \times \tan(\alpha) - \sigma\}}{L2 - L1}\right] = 31.0 \text{ deg}$$

In this embodiment, the arrangement angle of the first reflecting mirror M1 is set so that the angle θ satisfies the conditional expression (1):

4.8 (degrees)<θ<31.0 (degrees)

Thus, no interference occurs between the light beam from the first reflecting mirror M1 and the imaging lens G1, and the second reflecting mirror M2 is disposed between the optical deflector and the imaging lens G1 to reduce the height of the optical box.

In this embodiment, the oscillation mirror is used as the deflection unit. However, the present invention is not limited thereto. A polygon mirror (rotational polygon mirror) may be used to configure the optical scanning apparatus.

(Color Image Forming Apparatus)

Figure 5:
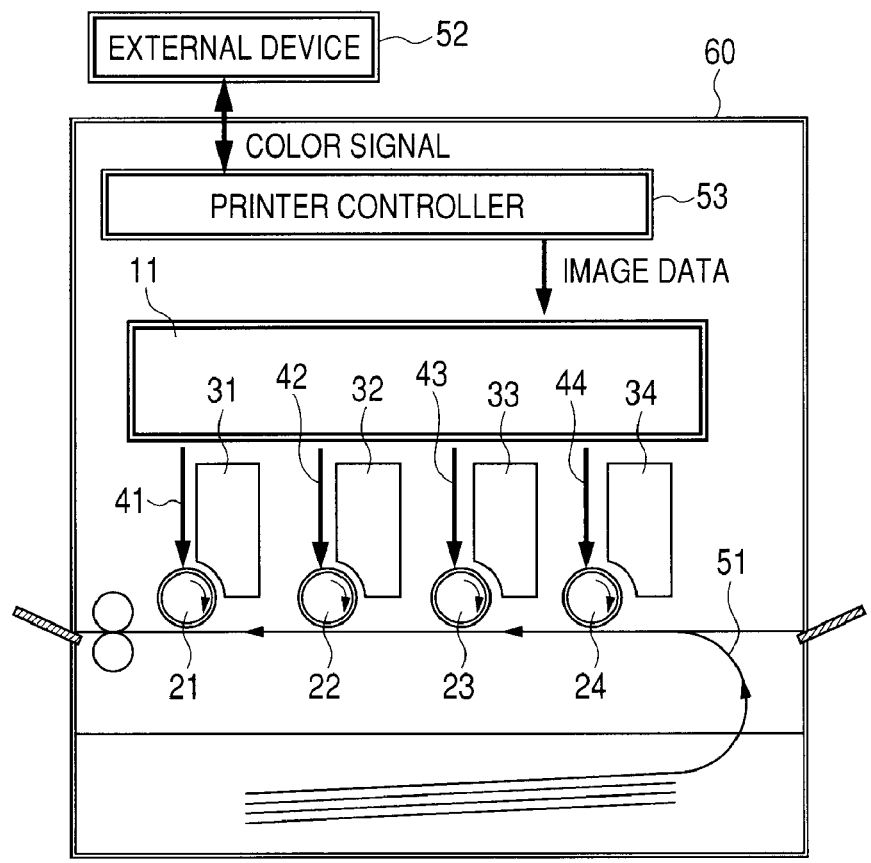
FIG. 5 is a main portion schematic diagram illustrating a color image forming apparatus according to an embodiment of the present invention.
Figure 6:
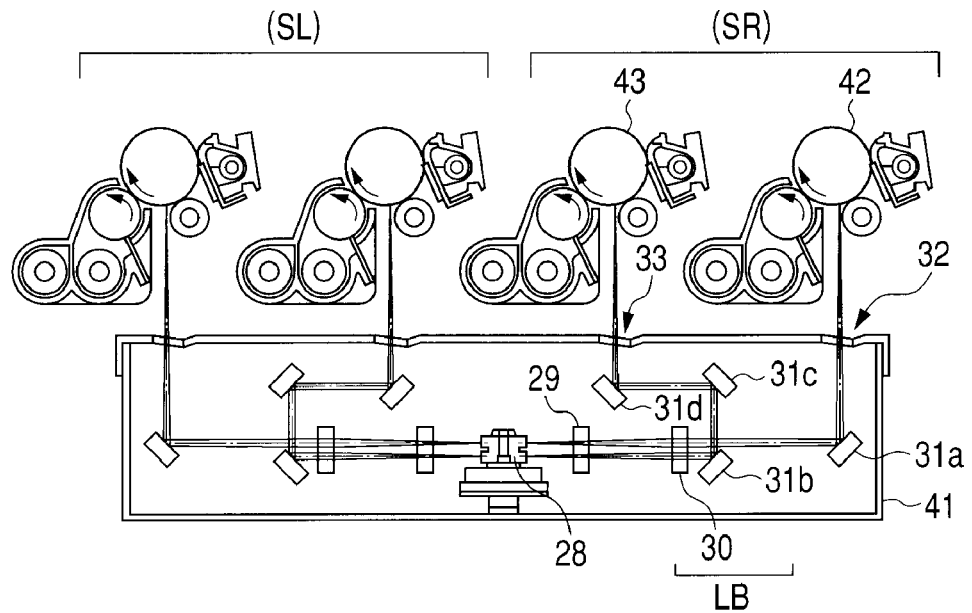
FIG. 6 is a main portion sectional view of a conventional image forming apparatus.

FIG. 5 is a main portion schematic diagram illustrating a color image forming apparatus according to an embodiment of the present invention.

The color image forming apparatus according to this embodiment is a tandem type color image forming apparatus in which the photosensitive drums each serving as an image bearing member is scanned by four beams guided by an optical scanning apparatus to record image information in parallel thereon. In FIG. 5, a color image forming apparatus 60 includes an optical scanning apparatus 11 having the configuration described in any one of the first to third embodiments, photosensitive drums 21, 22, 23, and 24 each serving as an image bearing member, developing devices 31, 32, 33, and 34, and a transport belt 51.

In FIG. 5, the respective color signals of red (R), green (G), and blue (B) are input from an external device 52 such as a personal computer to the color image forming apparatus 60. The color signals are converted into the image data (dot data) of yellow (Y), magenta (M), cyan (C), and black (B) by a printer controller 53 in the color image forming apparatus. The image data is input to the optical scanning apparatus 11. Light beams 41, 42, 43, and 44 which are modulated according to the respective image data are emitted from the optical scanning apparatus 11. The photosensitive surfaces of the photosensitive drums 21, 22, 23, and 24 are scanned with the light beams in a main-scanning direction.

According to the color image forming apparatus in this embodiment, the optical scanning apparatus 11 guides, for scanning, the four beams which respectively correspond to the respective colors of yellow (Y), magenta (M), cyan (C), and black (B). The image signals (image information) are recorded in parallel on the surfaces of the photosensitive drums 21, 22, 23, and 24, thereby printing a color image at high speed.

According to the color image forming apparatus in this embodiment, as described above, latent images of the respective colors are formed on the corresponding surfaces of the photosensitive drums 21, 22, 23, and 24 using the light beams based on the respective image data by the scanning optical apparatus 11. After that, the multi-transfer is performed on a recording material to produce a full color image.

For example, a color image reading apparatus including a CCD sensor may be used as the external device 52. In this case, the color image reading apparatus and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-213757, filed Aug. 22, 2008 which is hereby incorporated by reference herein in its entirety.

What is claimed is:

1. An optical scanning apparatus, comprising:
a light source unit;
a deflection unit for deflecting a light beam (Ray1) emitted from the light source unit for scanning; and
an imaging optical system for imaging, on a surface to be scanned, the light beam (Ray1) deflected by a deflecting surface of the deflection unit,
wherein the imaging optical system comprises, in an optical path in the following order from a side of the deflection unit:
an imaging optical element (G1);
a first reflecting mirror (M1); and
a second reflecting mirror (M2),
wherein the second reflecting minor (M2) is disposed, within a sub-scanning section, between the deflection unit and the imaging optical element (G1) in a direction of an optical axis of the imaging optical system, and
wherein the second reflecting minor (M2) and the imaging optical element (G1) overlap each other in a sub-scanning direction within the sub-scanning section, and the following conditional expression (1) is satisfied:

$$ATAN\left[\frac{\{0.55 \times h - L2 \times \tan(\alpha) - \sigma\}}{L2 - L1}\right] < \quad (1)$$
$$\theta < ATAN\left[\frac{\{h - L2 \times \tan(\alpha) - \sigma\}}{L2 - L1}\right]$$

where α denotes an oblique incident angle of a principal ray of the light beam (Ray1) in the sub-scanning direction, which enters the deflecting surface of the deflection unit from a direction oblique to the optical axis of the imaging optical system within the sub-scanning section; L1 (mm) denotes an interval in the optical axis direction of the imaging optical system, between a deflection-for-scanning point O and an optical surface on the surface-to-be-scanned side of the imaging optical element (G1), L2 (mm) denotes an interval in the optical axis direction of the imaging optical system, between the deflection-for-scanning point O and a reflection point P of the first reflecting minor (M1); h (mm) denotes a length of the imaging optical element (G1) in the sub-scanning direction; σ (mm) denotes an interval in the sub-scanning direction between the deflection-for-scanning point O and a profile center C of the imaging optical element (G1); and θ (degree) denotes an angle, in the sub-scanning direction, between the principal ray of the light beam (Ray1) reflected by a reflection surface of the first reflecting mirror (M1) and a plane perpendicular to a rotational axis of the deflection unit.

2. An optical scanning apparatus according to claim 1, wherein:
a plurality of light beams enters the same deflecting surface of the deflection unit;
the plurality of light beams enters the different surfaces to be scanned;
the plurality of the light beams guided to a plurality of the different surfaces to be scanned passes, within the sub-scanning section, through the respective different areas of the imaging optical element (G1);

the light beam (Ray1) of one of the plurality of the light beams passes through the imaging optical element (G1) through a position displaced from a profile center of the imaging optical element (G1) in the sub-scanning direction, within the sub-scanning section; and when within the sub-scanning section, one of two edge surfaces of the imaging optical element (G1), which is closer to a passing position of the light beam (Ray1) is defined as an edge surface A, and the other edge surface which is farther from the passing position of the light beam (Ray1) is defined as an edge surface B, the first reflecting minor (M1) reflects the light beam (Ray1) having passed through the imaging optical element (G1) within the sub-scanning section to fold the optical path toward a edge-surface-A side.

3. An optical scanning apparatus according to claim 1, wherein, within the sub-scanning section, the light beam (Ray1) enters the deflecting surface of the deflection unit from a direction oblique to the optical axis of the imaging optical system.

4. An optical scanning apparatus according to claim 2, wherein the light beam (Ray1) is a light beam guided to the surface to be scanned which is physically closest to the deflection unit among the plurality of surfaces to be scanned within the sub-scanning section.

5. An optical scanning apparatus according to claim 1, wherein the first reflecting mirror (M1) and the second reflecting mirror (M2) overlap each other in the sub-scanning direction within the sub-scanning section.

6. An optical scanning apparatus according to claim 2, wherein the plurality of the light beams deflected by the same deflecting surface of the deflection unit do not intersect one another in the sub-scanning section after passing through the imaging optical element (G1).

7. An optical scanning apparatus according to claim 1, wherein projections of the imaging optical element (G1), the first reflecting minor (M1), and the second reflecting minor (M2) onto a main-scanning section do not overlap one another.

8. An image forming apparatus, comprising:
the optical scanning apparatus according to claim 1;
a photosensitive drum disposed on the surface to be scanned;
a developing device for developing, as a toner image, an electrostatic latent image formed on the photosensitive drum by scanning with the scanning light beam by the optical scanning apparatus;
a transferring device for transferring the developed toner image to a transfer material; and
a fixing device for fixing the transferred toner image onto the transfer material.

* * * * *